United States Patent
Nandam et al.

(10) Patent No.: US 8,904,227 B2
(45) Date of Patent: Dec. 2, 2014

(54) CACHE SELF-TESTING TECHNIQUE TO REDUCE CACHE TEST TIME

(75) Inventors: Narendra Chakravarthy Nandam, Fremont, CA (US); Donald B. Kay, San Diego, CA (US)

(73) Assignee: Oracle International Corporation, Redwood City, CA (US)

( * ) Notice: Subject to any disclaimer, the term of this patent is extended or adjusted under 35 U.S.C. 154(b) by 113 days.

(21) Appl. No.: 13/562,208

(22) Filed: Jul. 30, 2012

(65) Prior Publication Data

US 2014/0032968 A1    Jan. 30, 2014

(51) Int. Cl.
*G06F 11/00*    (2006.01)

(52) U.S. Cl.
USPC ................................. 714/6.1; 714/25; 714/35

(58) Field of Classification Search
USPC .......................... 714/35, 6.1, 6.11, 4.12, 25, 48
See application file for complete search history.

(56) References Cited

U.S. PATENT DOCUMENTS

| | | | |
|---|---|---|---|
| 2004/0098575 A1 | 5/2004 | Datta et al. | |
| 2004/0103272 A1 | 5/2004 | Zimmer et al. | |
| 2006/0005092 A1 | 1/2006 | Frodsham et al. | |
| 2007/0005952 A1 | 1/2007 | Ho | |
| 2008/0005616 A1* | 1/2008 | Barlow et al. | 714/30 |
| 2009/0083579 A1* | 3/2009 | Lockwood et al. | 714/30 |
| 2009/0327681 A1 | 12/2009 | Rangarajan et al. | |
| 2013/0326263 A1* | 12/2013 | Alameldeen et al. | 714/6.2 |

* cited by examiner

*Primary Examiner* — Sarai Butler
(74) *Attorney, Agent, or Firm* — Robert C. Kowert; Meyertons, Hood, Kivlin, Kowert & Goetzel, P.C.

(57) ABSTRACT

A method for identifying, based on instructions stored externally to a processor containing a cache memory, a functional portion of the cache memory, then loading cache test code into the functional portion of the cache memory from an external source, and executing the cache test code stored in the cache memory to test the cache memory on a cache-line-granular basis and store fault information.

20 Claims, 7 Drawing Sheets

CACHE SELF-TESTING TECHNIQUE TO REDUCE CACHE TEST TIME

BACKGROUND

1. Technical Field

This invention relates to integrated circuits, and more particularly, to techniques for implementing embedded test functionality within integrated circuits having multiple processor cores and cache memories.

2. Description of the Related Art

Integrated circuits, which may include microprocessors and other digital logic devices as well as analog and mixed-signal devices, may generally include a significant number of semiconductor components manufactured through complex fabrication processes. As manufacturing geometries shrink, complex designs including hundreds of millions of interconnected transistor devices become feasible. However, advances in integrated circuit density and design and manufacturing complexity significantly increase the challenge of ensuring that the resulting device is functional, reliable and capable of operating within expected performance and environmental parameters.

For example, as microprocessor implementations become increasingly sophisticated, it may become more difficult to functionally verify the design, as increased functional complexity may lead to a greater number of possibilities for error in implementation. Likewise, as device geometries shrink, opportunities for manufacturing defects increase due to manufacturing environment impurities, process inconsistency, and other factors.

Integrated circuits are often tested during the manufacturing process through the use of a test environment including sophisticated and expensive automated test equipment. However, reliance on such test equipment may represent a significant time and economic cost in the manufacture of complex integrated circuits. For example, test equipment is often a limited resource within a test environment. If increased integrated circuit complexity requires an increased number of tests or duration of testing for a given circuit, overall manufacturing throughput may be correspondingly decreased, which may raise manufacturing costs. Alternatively, if the number of tests to be run is constrained to reduce overall testing time, product reliability may be impaired (e.g., if a defective product fails to be detected as such). Further, test equipment is generally an expensive resource whose cost scales with the complexity of the testing being performed. An integrated circuit with a large number of high-speed interface pins, for example, may thus require more expensive test equipment to adequately test the design, which may in turn increase manufacturing costs.

SUMMARY

The present disclosure provides systems and methods for testing cache memories on processors. To that end, systems and methods disclosed herein provide the expression of methods that allow for the testing of cache memories.

In a non-limiting embodiment, a portion of a cache memory, in a processor, sufficiently functional to store cache test code is identified using instructions stored externally to the processor. Cache test code, from a source external to the processor, may then be stored in the identified portion of the cache memory. The cache test code stored in the portion of the cache memory may then be executed by the processor to test the cache memory on a cache-line-granular basis, and fault information may be stored.

In one implementation, a service processor external to the processor may execute the instructions external to the processor to identify the portion of the cache memory.

In another non-limiting embodiment, dependent upon the stored fault information, cache lines of the cache memory may be retired.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION OF EMBODIMENTS

Figure 1:
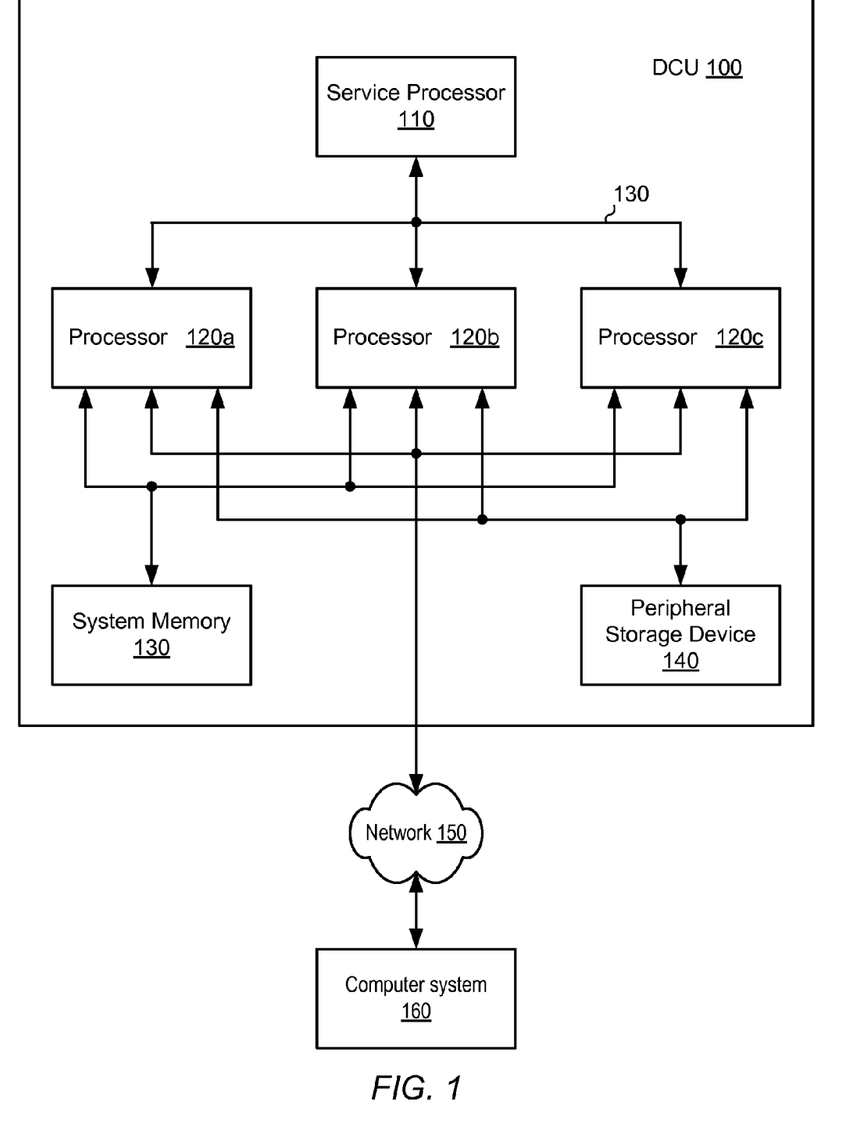
FIG. 1 is a block diagram of an embodiment of a distributed computing unit.

A block diagram illustrating one embodiment of a distributed computing unit (DCU) 100 is shown in FIG. 1. In the illustrated embodiment, DCU 100 includes a service processor 110, coupled to a plurality of processors 120*a-c* through scalable system interface (SSI) 130. Processors 120*a-c* are in turn coupled to system memory 130, and peripheral storage device 140. DCU 100 is coupled to a network 150 which is in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120a-c via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processors 120a-c, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120a-c, such as from a power-on reset state. Additionally, in some embodiments, service processor 110 may include a programmable read-only memory (PROM) that may store instructions to perform a power-on self-test (POST). In various embodiments, service processor 110 may be configured to allow access to administrative functions such as test and debug modes of processors 120a-c, such as testing cache memories in processors 120a-c, or providing test code to processors 120a-c such that each of processors 120a-c may test their respective cache memories, for example.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through SSI bus 130 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the distributed computing system illustrated in FIG. 1 is one of several examples. In other embodiments, different numbers and configurations of components are possible and contemplated.

Processor Overview

Figure 2:
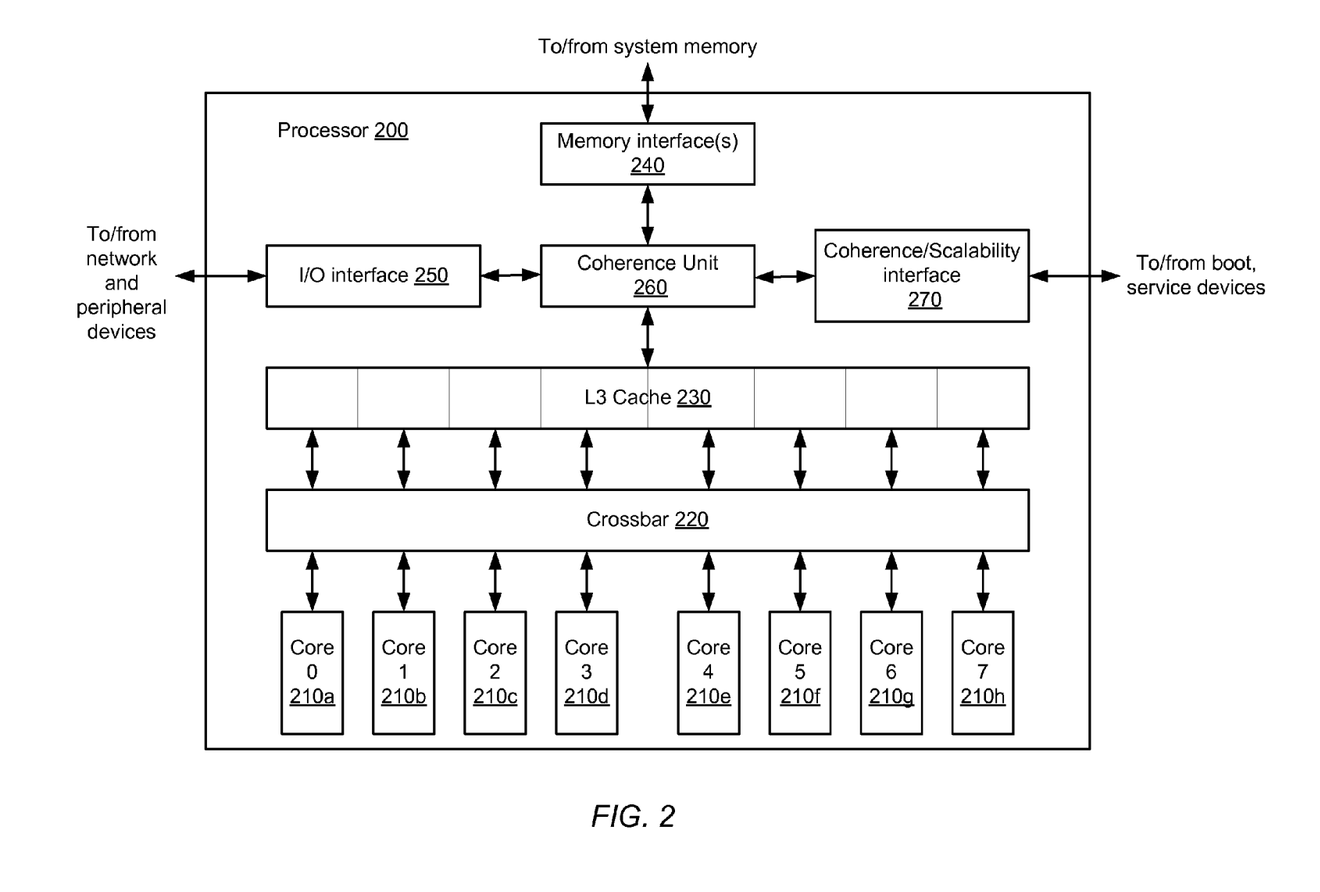
FIG. 2 is a block diagram of an embodiment of a processor.

A block diagram illustrating one embodiment of a multi-threaded processor 200 is shown in FIG. 2. In some embodiments, processor 200 may correspond to processors 120a-c of DCU 100 in FIG. 1. In the illustrated embodiment, processor 200 includes a plurality of processor cores 210a-h, which are also designated "core 0" though "core 7." It is noted that although 8 cores are shown, in various embodiments, any suitable number of processor cores may be employed. Each of cores 210 is coupled to an L3 cache 230 via a crossbar 220. L3 cache 230 is coupled to coherence unit 260 which is in turn coupled to input/output (I/O) interface 250, coherence/scalability interface 270. Additionally, coherence unit 260 is coupled to one or more memory interface(s) 240, which are coupled in turn to one or more banks of system memory (not shown). As described in greater detail below, I/O interface 250 may couple processor 200 to peripheral devices, and a network. Coherence/scalability interface 270 may couple processor 200 to boot and/or service devices such as, e.g., service processor 110 in DCU 100. In some embodiments, the elements included in processor 200 may be fabricated as part of a single integrated circuit (IC), for example on a single semiconductor die.

Cores 210 may be configured to execute instructions and to process data according to a particular instruction set architecture (ISA). In one embodiment, cores 210 may be configured to implement the SPARC® V9 ISA, although in other embodiments it is contemplated that any desired ISA may be employed, such as x86, PowerPC® or MIPS®, for example. In the illustrated embodiment, each of cores 210 may be configured to operate independently of the others, such that all cores 210 may execute in parallel. Additionally, in some embodiments each of cores 210 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 210 may also be referred to as a multithreaded (MT) core. In one embodiment, each of cores 210 may be configured to concurrently execute instructions from eight threads, for a total of 64 threads concurrently executing across processor 200. However, in other embodiments it is contemplated that other numbers of cores 210 may be provided, and that cores 210 may concurrently process different numbers of threads.

Crossbar 220 may be configured to manage data flow between cores 210 and the shared L3 cache 230. In one embodiment, crossbar 220 may include logic (such as multiplexers or a switch fabric, for example) that allows any core 210 to access any bank of L3 cache 230, and that conversely allows data to be returned from any L3 bank to any core 210. Crossbar 220 may be configured to concurrently process data requests from cores 210 to L3 cache 230 as well as data responses from L3 cache 230 to cores 210. In some embodiments, crossbar 220 may include logic to queue data requests and/or responses, such that requests and responses may not block other activity while waiting for service. Additionally, in one embodiment crossbar 220 may be configured to arbitrate conflicts that may occur when multiple cores 210 attempt to access a single bank of L3 cache 230.

L3 cache 230 may be configured to cache instructions and data for use by cores 210. In the illustrated embodiment, L3 cache 230 may be organized into eight separately addressable banks that may each be independently accessed, such that in the absence of conflicts, each bank may concurrently return data to a respective core 210. In some embodiments, each individual bank may be implemented using set-associative or direct-mapped techniques. For example, in one embodiment, L3 cache 230 may be a 48 megabyte (MB) cache, where each bank is 12-way set associative with a 64-byte line size, although other cache sizes and geometries are possible and contemplated. L3 cache 230 may be implemented in some embodiments as a writeback cache in which written (dirty) data may not be written to system memory until a corresponding cache line is evicted.

In some embodiments, L3 cache 230 may be configured to operate in a diagnostic mode that allows direct access to the cache memory. For example, in such a mode, L3 cache 230 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L3 cache 230 that may be used by, for example, service processor 110 to store data into L3 cache 230. Alternatively, crossbar 220 may be configured to allow direct access to L3 cache 230 by processor cores 210 or through network interface 270 or I/O interface 250.

L3 cache 230 may be further configured to implement a built-in self-test (BIST). An address generator, a test pattern generator, and a BIST controller may be included in L3 cache 230. The address generator, test pattern generator, and BIST controller may be implemented in hardware, software, or a combination thereof. The BIST may perform tests such as, e.g., checkerboard, walking 1/0, sliding diagonal, and the like, to determine that data storage cells within L3 cache 230 are capable of storing both a logical 0 and logical 1. In the case where the BIST determines that not all data storage cells within L3 cache 230 are functional, a flag or other signal may be sent to service processor 110 or one or more of processor cores 210 indicating that L3 cache 230 is faulty.

In some embodiments, L3 cache 230 may implement queues for requests arriving from and results to be sent to crossbar 220. Additionally, in some embodiments L3 cache 230 may implement a fill buffer configured to store fill data arriving from memory interface 240, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 230 may variously be implemented as single-ported or multiported (i.e., capable of processing multiple concurrent read and/or write accesses). In either case, L3 cache 230 may implement arbitration logic to prioritize cache access among various cache read and write requestors.

Memory interface 240 may be configured to manage the transfer of data between L3 cache 230 and system memory, for example in response to L3 fill requests and data evictions. In some embodiments, multiple instances of memory interface 240 may be implemented, with each instance configured to control a respective bank of system memory. Memory interface 240 may be configured to interface to any suitable type of system memory, such as described above in reference to FIG. 11*n* some embodiments, memory interface 240 may be configured to support interfacing to multiple different types of system memory.

In the illustrated embodiment, processor 200 may also be configured to receive data from sources other than system memory. I/O interface 250 may be configured to provide a central interface for such sources to exchange data with cores 210 and/or L3 cache 230 via coherence unit 260. In some embodiments, I/O interface 250 may be configured to coordinate Direct Memory Access (DMA) transfers of data between external peripherals and system memory via coherence unit 260 and memory interface 240. In addition to coordinating access between crossbar 220 and other interface logic, in one embodiment I/O interface 250 may be configured to couple processor 200 to external boot and/or service devices. For example, initialization and startup of processor 200 may be controlled by an external device (such as, e.g., a FPGA) that may be configured to provide an implementation- or system-specific sequence of boot instructions and data. Such a boot sequence may, for example, coordinate reset testing, initialization of peripheral devices and initial execution of processor 200, before the boot process proceeds to load data from a disk or network device. Additionally, in some embodiments such an external device may be configured to place processor 200 in a debug, diagnostic, or other type of service mode upon request.

I/O interface 250 may be configured to coordinate data transfer between processor 200 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, I/O interface 250 may implement one or more instances of an interface such as Peripheral Component Interface Express (PCI Express™), although it is contemplated that any suitable interface standard or combination of standards may be employed. For example, in some embodiments I/O interface 250 may be configured to implement a version of Universal Serial Bus (USB) protocol or IEEE 1394 (Firewire®) protocol in addition to or instead of PCI Express™.

I/O interface 250 may also be configured to coordinate data transfer between processor 200 and one or more devices (e.g., other computer systems) coupled to processor 200 via a network. In one embodiment, I/O interface 250 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O interface 250 may be configured to implement multiple discrete network interface ports.

Core Overview

Figure 3:
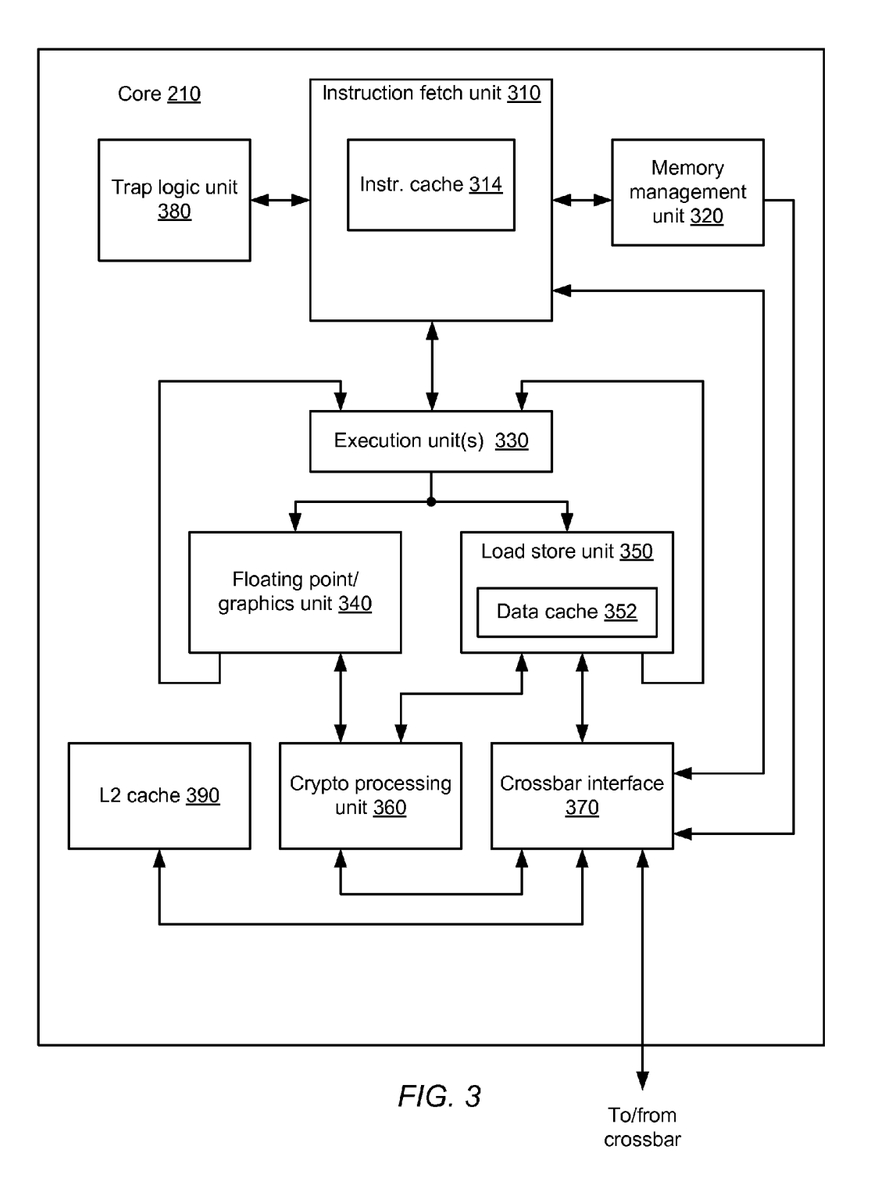
FIG. 3 is a block diagram of an embodiment of a processor core.

A possible embodiment of core 210 configured is illustrated in FIG. 3. In the illustrated embodiment, core 210 includes an instruction fetch unit (IFU) 310 coupled to a memory management unit (MMU) 320, a crossbar interface 370, a trap logic unit (TLU) 380, a L2 cache memory 390, and a plurality of execution units 330. Execution units 330 is coupled to both a floating point/graphics unit (FGU) 340 and a load store unit (LSU) 350. Each of the latter units is also coupled to send data back to each of execution units 330. Both FGU 340 and LSU 350 are coupled to a crypto processing unit 360. Additionally, LSU 350, crypto processing unit 360, L2 cache memory 390 and MMU 320 are coupled to crossbar interface 370, which may in turn be coupled to crossbar 220 shown in FIG. 2.

Instruction fetch unit 310 may be configured to provide instructions to the rest of core 210 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 further includes an instruction cache 314. In one embodiment, IFU 310 may include logic to maintain fetch addresses (e.g., derived from program counters) corresponding to each thread being executed by core 210, and to coordinate the retrieval of instructions from instruction cache 314 according to those fetch addresses. Additionally, in some embodiments IFU 310 may include logic to predict branch outcomes and/or fetch target addresses, such as a Branch History Table (BHT), Branch Target Buffer (BTB), or other suitable structure, for example.

In one embodiment, IFU 310 may be configured to maintain a pool of fetched, ready-for-issue instructions drawn from among each of the threads being executed by core 210. For example, IFU 310 may implement a respective instruction buffer corresponding to each thread in which several recently-fetched instructions from the corresponding thread may be stored. In some embodiments, IFU 310 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 310 may be configured to further prepare instructions for execution, for example by decoding instructions, detecting scheduling hazards, arbitrating for access to contended resources, or the like. Moreover, in some embodiments, instructions from a given thread may be speculatively issued from IFU 310 for execution. For example, a given instruction from a certain thread may fall in the shadow of a conditional branch instruction from that same thread that was predicted to be taken or not-taken, or a load instruction from that same thread that was predicted to hit in data cache 352, but for which the actual outcome has not yet been determined. In such embodiments, after receiving notice of a misspeculation such as a branch misprediction or a load miss, IFU 310 may be configured to cancel misspeculated instructions from a given thread as well as issued instructions from the given thread that are dependent on or subsequent to the misspeculated instruction, and to redirect instruction fetch appropriately.

Execution unit 330 may be configured to execute and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, core 210 may include more than one execution unit 330, and each of the execution units may or may not be symmetric in functionality. Finally, in the illustrated embodiment instructions destined for FGU 340 or LSU 350 pass through execution unit 330. However, in alternative embodiments it is contemplated that such instructions may be issued directly from IFU 310 to their respective units without passing through execution unit 330.

Floating point/graphics unit 340 may be configured to execute and provide results for certain floating-point and graphics-oriented instructions defined in the implemented ISA. For example, in one embodiment FGU 340 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 340 may implement partitioned-arithmetic and graphics-oriented instructions defined by a version of the SPARC® Visual Instruction Set (VIS™) architecture, such as VIS™ 2.0. Additionally, in one embodiment FGU 340 may implement certain integer instructions such as integer multiply, divide, and population count instructions, and may be configured to perform multiplication operations on behalf of stream processing unit 240. Depending on the implementation of FGU 360, some instructions (e.g., some transcendental or extended-precision instructions) or instruction operand or result scenarios (e.g., certain denormal operands or expected results) may be trapped and handled or emulated by software.

In the illustrated embodiment, FGU 340 may be configured to store floating-point register state information for each thread in a floating-point register file. In one embodiment, FGU 340 may implement separate execution pipelines for floating point add/multiply, divide/square root, and graphics operations, while in other embodiments the instructions implemented by FGU 340 may be differently partitioned. In various embodiments, instructions implemented by FGU 340 may be fully pipelined (i.e., FGU 340 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 350 may be configured to process data memory references, such as integer and floating-point load and store instructions as well as memory requests that may originate from stream processing unit 360. In some embodiments, LSU 350 may also be configured to assist in the processing of instruction cache 314 misses originating from IFU 310. LSU 350 may include a data cache 352 as well as logic configured to detect cache misses and to responsively request data from L3 cache 230 via crossbar interface 370. In one embodiment, data cache 352 may be configured as a write-through cache in which all stores are written to L3 cache 230 regardless of whether they hit in data cache 352; in some such embodiments, stores that miss in data cache 352 may cause an entry corresponding to the store data to be allocated within the cache. In other embodiments, data cache 352 may be implemented as a write-back cache.

In one embodiment, LSU 350 may include a miss queue configured to store records of pending memory accesses that have missed in data cache 352 such that additional memory accesses targeting memory addresses for which a miss is pending may not generate additional L3 cache request traffic. In the illustrated embodiment, address generation for a load/store instruction may be performed by one of EXUs 330. Depending on the addressing mode specified by the instruction, one of EXUs 330 may perform arithmetic (such as adding an index value to a base value, for example) to yield the desired address. Additionally, in some embodiments LSU 350 may include logic configured to translate virtual data addresses generated by EXUs 330 to physical addresses, such as a Data Translation Lookaside Buffer (DTLB).

Crypto processing unit 360 may be configured to implement one or more specific data processing algorithms in hardware. For example, crypto processing unit 360 may include logic configured to support encryption/decryption algorithms such as Advanced Encryption Standard (AES), Data Encryption Standard/Triple Data Encryption Standard (DES/3DES), or Ron's Code #4 (RC4). Crypto processing unit 240 may also include logic to implement hash or checksum algorithms such as Secure Hash Algorithm (SHA-1, SHA-256), Message Digest 5 (MD5), or Cyclic Redundancy Checksum (CRC). Crypto processing unit 360 may also be configured to implement modular arithmetic such as modular multiplication, reduction and exponentiation. In one embodiment, crypto processing unit 360 may be configured to utilize the multiply array included in FGU 340 for modular multiplication. In various embodiments, crypto processing unit 360 may implement several of the aforementioned algorithms as well as other algorithms not specifically described.

Crypto processing unit 360 may be configured to execute as a coprocessor independent of integer or floating-point instruction issue or execution. For example, in one embodiment crypto processing unit 360 may be configured to receive operations and operands via control registers accessible via software; in the illustrated embodiment crypto processing unit 360 may access such control registers via LSU 350. In such embodiments, crypto processing unit 360 may be indirectly programmed or configured by instructions issued from IFU 310, such as instructions to read or write control registers. However, even if indirectly programmed by such instructions, crypto processing unit 360 may execute independently without further interlock or coordination with IFU 310. In another embodiment crypto processing unit 360 may receive operations (e.g., instructions) and operands decoded and issued from the instruction stream by IFU 310, and may execute in response to such operations. That is, in such an embodiment crypto processing unit 360 may be configured as an additional functional unit schedulable from the instruction stream, rather than as an independent coprocessor.

In some embodiments, crypto processing unit 360 may be configured to freely schedule operations across its various algorithmic subunits independent of other functional unit activity. Additionally, crypto processing unit 360 may be configured to generate memory load and store activity, for example to system memory. In the illustrated embodiment, crypto processing unit 360 may interact directly with crossbar interface 370 for such memory activity, while in other embodiments crypto processing unit 360 may coordinate memory activity through LSU 350. In one embodiment, software may poll crypto processing unit 360 through one or more control registers to determine result status and to retrieve ready results, for example by accessing additional control registers. In other embodiments, FGU 340, LSU 350 or other logic may be configured to poll crypto processing unit 360 at intervals to determine whether it has results that are ready to write back. In still other embodiments, crypto processing unit 360 may be configured to generate a trap when a result is ready, to allow software to coordinate result retrieval and processing.

L2 cache memory 390 may be configured to cache instructions and data for use by execution unit 330. In the illustrated embodiment, L2 cache memory 390 may be organized into multiple separately addressable banks that may each be independently accessed. In some embodiments, each individual bank may be implemented using set-associative or direct-mapped techniques.

L2 cache memory 390 may be implemented in some embodiments as a writeback cache in which written (dirty) data may not be written to system memory until a corresponding cache line is evicted. L2 cache memory 390 may variously be implemented as single-ported or multiported (i.e., capable of processing multiple concurrent read and/or write accesses). In either case, L2 cache memory 390 may implement arbitration logic to prioritize cache access among various cache read and write requestors.

In some embodiments, L2 cache memory 390 may be configured to operate in a diagnostic mode that allows direct access to the cache memory. For example, in such a mode, L2 cache memory 390 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L2 cache memory 390. Alternatively, crossbar interface 370 or MMU 320 may be configured to allow direct access to L2 cache memory 390 via the crossbar interface.

L2 cache memory 390 may be further configured to implement a BIST. An address generator, a test pattern generator, and a BIST controller may be included in L2 cache memory 390. The address generator, test pattern generator, and BIST controller may be implemented in hardware, software, or a combination thereof. The BIST may perform tests such as, e.g., checkerboard, walking 1/0, sliding diagonal, and the like, to determine that data storage cells within L2 cache memory 390 are capable of storing both a logical 0 and logical 1. In the case where the BIST determines that not all data storage cells within L2 cache memory 390 are functional, a flag or other signal may be activated indicating that L2 cache memory 390 is faulty.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 314 or data cache 352. In the event no translation for a given virtual page number is found in the appropriate TLB, memory management unit 320 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 320 is unable to derive a valid address translation, for example if one of the memory pages including a necessary page table is not resident in physical memory (i.e., a page miss), MMU 320 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 210 may be configured to generate off-core memory or I/O requests. For example, IFU 310 or LSU 350 may generate access requests to L3 cache 230 in response to their respective cache misses. Crypto processing unit 360 may be configured to generate its own load and store requests independent of LSU 350, and MMU 320 may be configured to generate memory requests while executing a page table walk. Other types of off-core access requests are possible and contemplated. In the illustrated embodiment, crossbar interface 370 may be configured to provide a centralized interface to the port of crossbar 220 associated with a particular core 210, on behalf of the various functional units that may generate accesses that traverse crossbar 220. In one embodiment, crossbar interface 370 may be configured to maintain queues of pending crossbar requests and to arbitrate among pending requests to determine which request or requests may be conveyed to crossbar 220 during a given execution cycle. For example, crossbar interface 370 may implement a least-recently-used or other algorithm to arbitrate among crossbar requestors. In one embodiment, crossbar interface 370 may also be configured to receive data returned via crossbar 110, such as from L3 cache 230 or I/O interface 250, and to direct such data to the appropriate functional unit (e.g., data cache 352 for a data cache fill due to miss). In other embodiments, data returning from crossbar 220 may be processed externally to crossbar interface 370.

During the course of operation of some embodiments of core 210, exceptional events may occur. For example, an instruction from a given thread that is picked for execution by pick unit 316 may be not be a valid instruction for the ISA implemented by core 210 (e.g., the instruction may have an illegal opcode), a floating-point instruction may produce a result that requires further processing in software, MMU 320 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 380 may be configured to manage the handling of such events. For example, TLU 380 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 380 may be configured to flush all instructions from the trapping thread from any stage of processing within core 210, without disrupting the execution of other, non-trapping threads. In some embodiments, when a specific instruction from a given thread causes a trap (as opposed to a trap-causing condition independent of instruction execution, such as a hardware interrupt request), TLU 380 may implement such traps as precise traps. That is, TLU 380 may ensure that all instructions from the given thread that occur before the trapping instruction (in program order) complete and update architectural state, while no instructions from the given thread that occur after the trapping instruction (in program order) complete or update architectural state.

Cache Testing

In addition to the testing an integrated circuit may undergo post-manufacture, additional run-time testing may be performed particularly when the integrated circuit is initialized during power-up. Such testing may be performed to detect failures in the integrated circuit that may result from electrostatic discharge (ESD), excessive temperatures, power supply voltages beyond specified operating limits, and the like. In some cases, the results from such testing may be used to replace non-functional circuit blocks with redundant circuit blocks or to disable non-functional circuit blocks allowing the integrated circuit to continue to operate at a diminished capacity.

In the case of a processor or a computer processing system, the run-time testing may include some basic checks on functional blocks within the processor such as, e.g., FPU 340 of processor core 210 illustrated in FIG. 3. Of particular importance is the verification of the various cache memories contained within a processor. In some cases, small cache memories such as, e.g., data cache 352 of processor core 210 illustrated in FIG. 3, may be tested using a direct access diagnostic mode. For larger cache memories, however, testing using a direct access diagnostic mode, especially with the test running from PROM, may result in long test times which in turn may result in a delay before the processor or computer processing system is ready for operation.

In some cases, BIST or testing employing a direct access diagnostic mode may not provide detailed information on the nature of detected failures within a cache memory, but only a indication of if all data storage bits within the cache memory are functional. In some embodiments, however, it may be possible for a processor or computing system to function with a cache memory that contains a number of data storage cells that do not function. A fine-grained test such as, e.g., a cache-line granular test, may, as described further below, allow a processor or computing system to use a cache memory with non-functional data storage cells.

Figure 4:
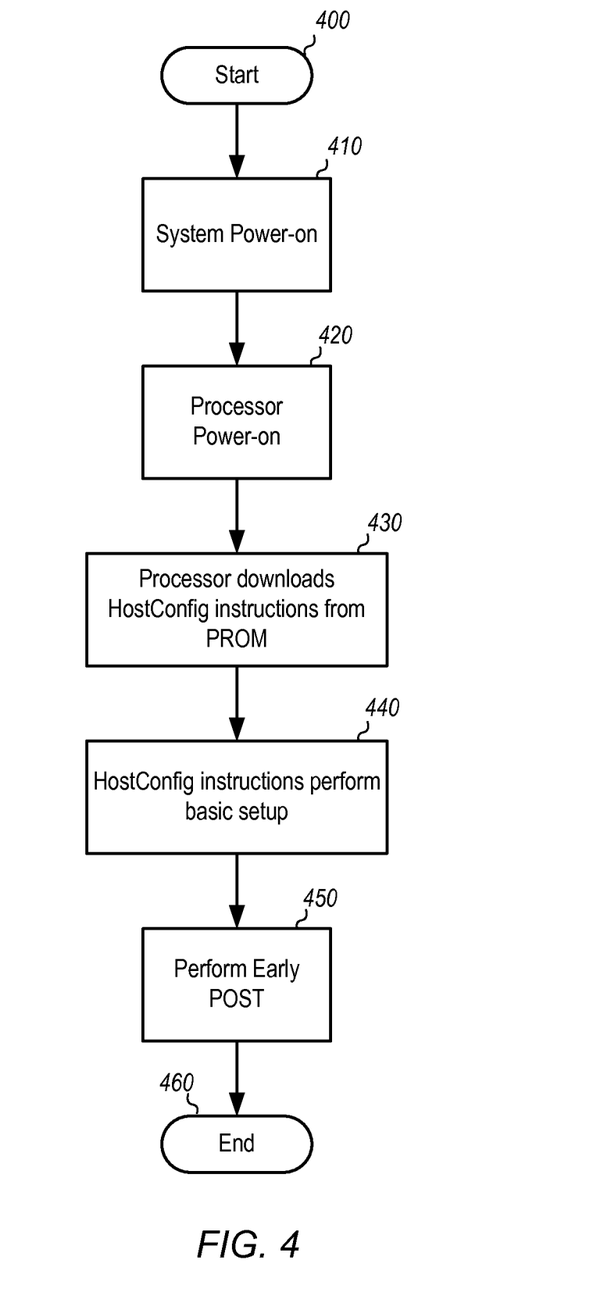
FIG. 4 illustrates an embodiment for configuring a processor during power-up.

A flowchart of an embodiment of a procedure to configure a processing system during power-up is illustrated in FIG. 4. Referring collectively to the distributed computing system illustrated in FIG. 1 and the flowchart illustrated in FIG. 4, the procedure begins in block 400. Power is then applied to DCU 100 (block 410). In some embodiments, each of service processor 110, processors 120a-c, system memory 130, and peripheral storage device 140 may have different power supply requirements which may necessitate the need for a plurality of power supplies for DCU 100. In other embodiments, power may be applied to the components included in DCU 100 in a sequential fashion to avoid possible latch-up conditions.

Once power has been applied to the components included in DCU 100, processors 120a-c and the other components included in DCU 100 begin their respective power-on sequences (block 420). In some embodiments of processors 120a-c, internal voltage regulators and power switch circuits may operate to apply power to different circuit blocks within processors 120 in a prescribed order. Analog circuit blocks such as crystal oscillators, for example, and other circuits that may require long initialization times may be activated as well.

Once the internal power levels have been established, processors 120a-c may then communicate with service processor 110 through bus 130 to download host configuration instructions (block 430). In some embodiments, the host configuration instructions may be stored in a PROM or other suitable non-volatile memory. In other embodiments, the host configuration instructions may be stored in memory on service processor 110.

One or more of processors 120a-c may then execute the host configuration instructions (block 440). The host configuration instructions may contain instructions to setup and initialize circuit blocks within the processors 120a-c, such as the phase-locked loop (PLL), for example. Other hardware within DCU 100 such as, e.g., peripheral storage device 140 and system memory 130 may also be initialized by the execution of the host configuration instructions. A single processor of processors 120a-c may, in some embodiments, be selected as the bootstrap processor to execute the host configuration instructions. The remaining processors may remain inactive while the bootstrap processor executes the host configuration instructions. Once the bootstrap processor has completed the execution of the host configuration instructions, the remaining processors may execute the host configuration instructions. In other embodiments, processors 120a-c may execute the host configuration instructions in parallel.

With the basic setup complete, early power-on self-test (POST) is performed (block 450). In some embodiments, POST may include executing BIST on one or more of the cache memories such as, e.g., L3 cache 230. In embodiments where BIST is implemented using software, the necessary instructions to perform the BIST may be downloaded from service processor 110. The results of the BIST may be stored in registers or other suitable memory on processors 120a-c, or in suitable memory on service processor 110. Once the BIST results have been stored, the procedure completes (block 460). In the illustrated embodiment, the steps are shown in sequential order. It is noted that in other embodiments, some steps may occur simultaneously or in a different order than the embodiment illustrated in FIG. 4.

Figure 5:
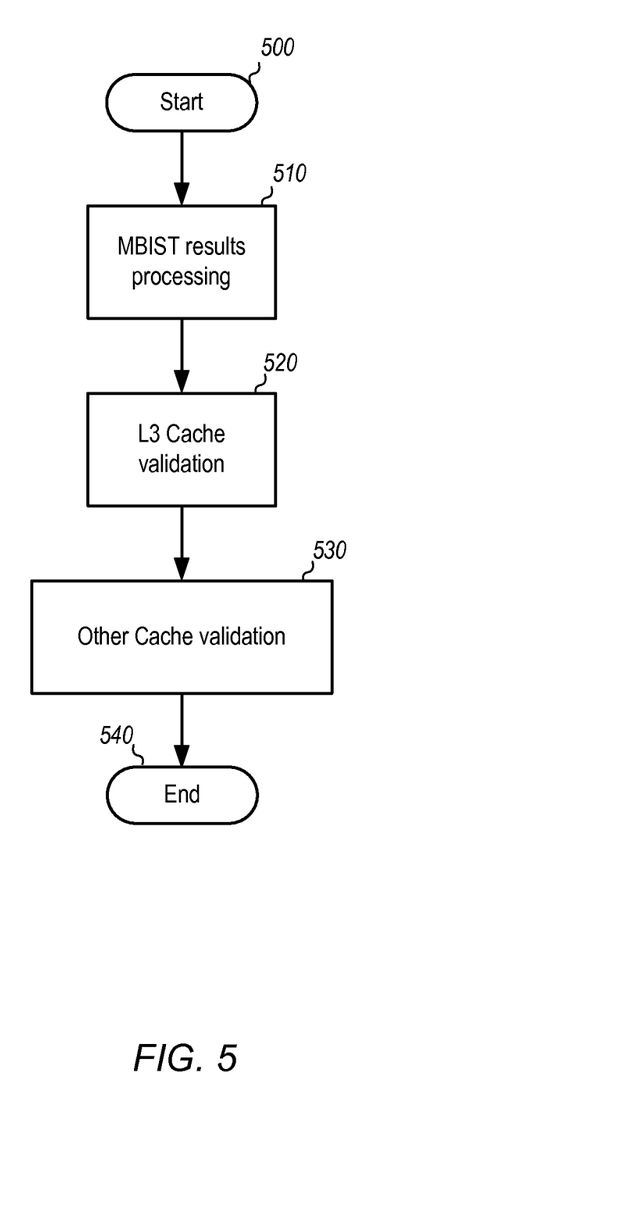
FIG. 5 illustrates an embodiment of a procedure for performing cache memory validation.

Turning to FIG. 5, a flowchart illustrating an embodiment of a method of validating a cache memory is depicted. Referring collectively to DCU 100 illustrated in FIG. 1, to processor 200 illustrated in FIG. 2 and to the flowchart of FIG. 5, the procedure begins in block 500. One of processor cores 210 may process the results of the BIST performed during the early POST portion of the setup procedure as depicted in the flowchart of FIG. 4 (block 510). In some embodiments, the BIST may be read from a storage location on processor 200, and in other embodiments, the BIST may be read from a storage location on service processor 110.

In some embodiments, the BIST results may be used in part to determine the need for additional testing of L3 cache 230. For example, the BIST results may only indicate which bank of L3 cache 230 had a failure during BIST, but the results may not indicate how many failing data storage cells were detected and the address location of the failing data storage cells. In such cases, once the BIST results have been processed, a further test of L3 cache 230 may be performed (block 520). For example, as discussed further below, L3 cache 230 may be tested to determine which cache lines within L3 cache 230 are not functional. In other embodiments, an analysis of the BIST results may be bypassed and the test of the cache memory may be performed.

Once the additional validation has been performed on L3 cache 230, other cache memories, such as, e.g., L2 cache memory 390, instruction cache 314, and data cache 352 of core 210 illustrated in FIG. 3, may be validated in a similar method as described above (block 530). In some embodiments, results of a BIST of each cache may be used to determine the need for additional testing. In other embodiments, an analysis of the BIST results may be bypassed and testing may be performed.

Figure 6:
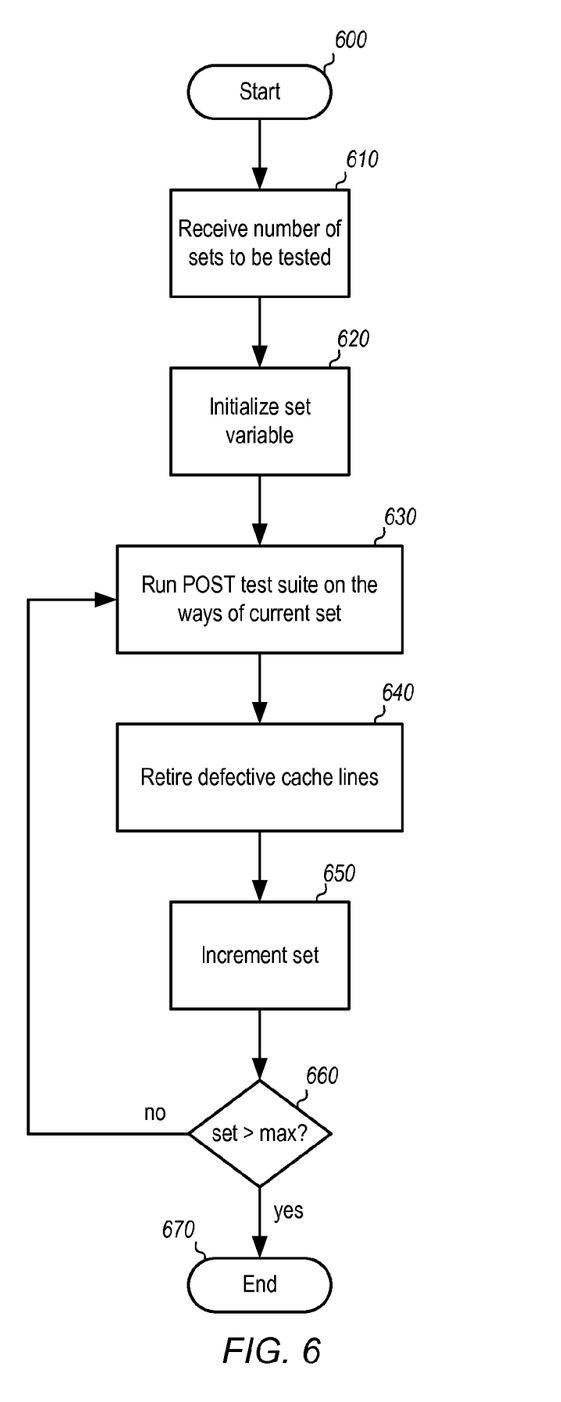
FIG. 6 illustrates an embodiment of a test procedure for testing a cache memory using instructions stored externally to the cache memory.

A procedure for testing a cache memory using instructions stored externally to the cache memory is illustrated in FIG. 6. Referring collectively to DCU 100 depicted in FIG. 1, processor 200 depicted in FIG. 2 and the flowchart illustrated in FIG. 6, the procedure begins in block 600. Processor 200 may then receive the number of sets within L3 cache 230 to be tested (block 610). In some embodiments, the number of sets may be received from a PROM or other suitable non-volatile memory. In certain embodiments, the PROM may be part of service processor 110 and may transfer the aforementioned number of sets via bus 130. A variable containing a value indicative of the number of sets within cache 230 that have been tested may then be initialized (block 620). In some embodiments, the variable may be set to zero, while in other embodiments, the variable may be initialized to any suitable value.

A POST test suite may then be run on each way within the set currently being tested (block 630). In some embodiments, the POST test suite may be executed by service processor 110, while in other embodiments, the test suite may be executed in parallel by each processor 120a-c on their respective L3 cache 230. The POST test suite may contain tests such as, e.g., checkerboard, walking 1/0, sliding diagonal, or any other suitable memory test. The results of the POST test suite may be saved in a register or other suitable storage in service processor 100 or processors 120a-c. Generally speaking, the intersection of a particular way with a set corresponds to a cache line. The testing of the ways within the set currently under test may report the functional status of each individual cache line within the set under test. Such testing may also be referred to as "cache-line-granular" testing, in that it facilitates the analysis of cache functionality at the relatively fine-grained level of individual cache lines, as opposed to the coarser-grained level of entire sets, ways, banks, or the cache as a whole. The storage of test results derived from testing individual cache lines may also be referred to as the storage of fault information on a cache-line-granular basis, in that the information indicates functional or non-functional status at the level of individual cache lines.

With the completion of the POST test suite on the current set, any ways within L3 cache 230 that are determined to be non-functional for the current set may be retired, i.e., the non-functional way is no longer used by processor 200 for that set (block 640). Retiring individual cache line(s) of a set that are determined to be non-functional may enable the remaining functional cache line(s) of that set to be used. This may increase the overall cache resources available for use, in contrast to caches that, for example, make an entire set or bank unavailable for use if it contains a failing line, even though most of the set or bank may be functional. In some embodiments, the retirement may be performed by employing a state bit associated with each cache line. In some embodiments, such a state bit may be stored with the cache line data in the data array, in the tag array, or elsewhere within L3 cache 230. When a cache line is to be accessed, the state bit associated with the cache line is analyzed to determine the functional status of the cache line. When a cache line state bit indicates that the cache line is non-functional, processor 200 may then consume an alternative cache line.

Alternatively, a central database containing the status of each cache line may be constructed in a known functional section of the cache or other suitable memory within processor 200. Prior to each cache access, set, way, bank information, or a combination thereof, may be used to index into the central data to determine the state of the selected cache line. When the state data retrieved from the central database indicates that the selected cache line is non-functional, an alternative cache line may then be selected by processor 200. It is noted that a selected set within a way of L3 cache 230 may correspond to a cache line.

The set variable may then be incremented so that additional sets may be tested (block 650). The value of the set variable is checked to determine whether a termination criterion is satisfied (block 660). For example, the set variable may be checked to determine whether it is less than (or possibly equal to) the maximum number of sets to be tested. When the termination condition is not yet satisfied, the POST test suite is executed again (block 630). When the termination condition is satisfied, the testing procedure may be considered completed (block 670).

Figure 7:
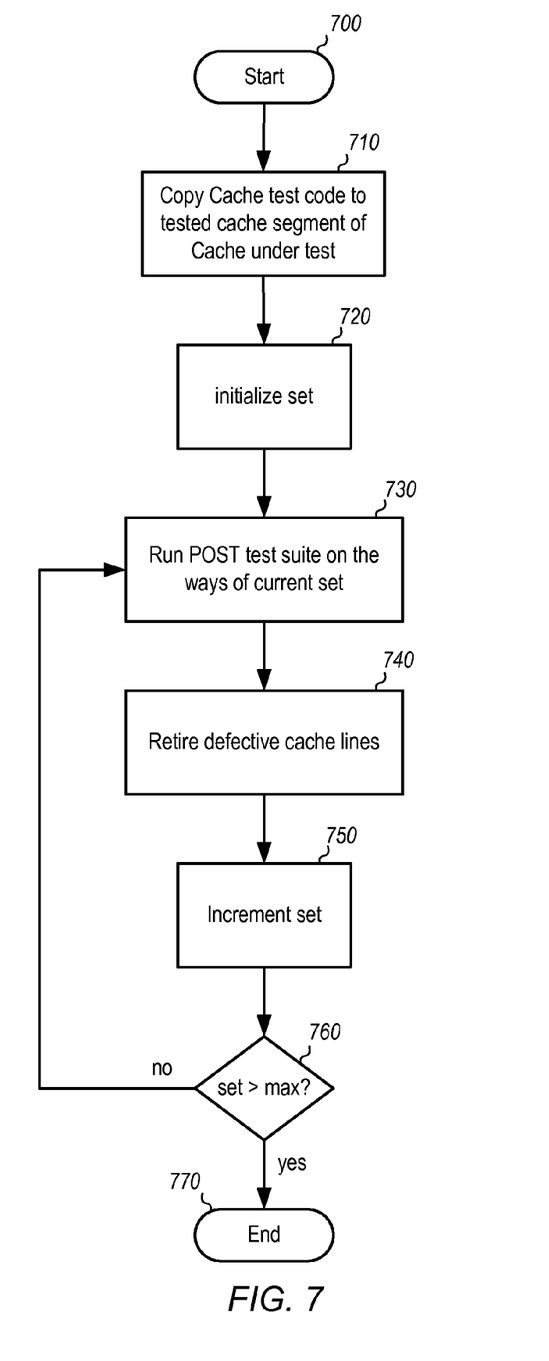
FIG. 7 illustrates an embodiment of a test procedure for testing a cache memory using instructions stored in a portion of the cache memory.

In some embodiments, a known functional portion of a cache memory may be used to store test code that may be used to test the cache memory. The known functional portion of the cache memory may be determined using BIST or using the test procedure described above in regards to FIG. 6. When the test code is stored in the cache memory, a processor, such as processor 200 illustrated in FIG. 2, may execute the test code, employing the high speed interface between the processor cores and the cache memory, rather than the slower interface between the processor and an external memory. Turning to FIG. 7, a procedure for testing a cache memory using test instructions stored in the cache memory is illustrated. Referring collectively to DCU 100 illustrated in FIG. 1, processor 200 of FIG. 2, and the flowchart of FIG. 7, the procedure begins in block 700. Cache test code may be copied into known a known functional portion of a cache memory, such as, e.g., L3 cache 230 of processor 200, from an external source such as a PROM. In some embodiments, the PROM may be contained within service processor 110 (block 710). The cache test code may be organized such that there are no cache misses during execution of the cache test code. In some embodiments, the IFU 310 may be configured to fetch the cache test code such that the test code may be stored contiguously in the physical memory array of the cache, while being located across multiple banks, sets and ways of the cache. For example, rather than being stored at instruction-aligned memory addresses decided by the linker/loader at the time of code build, the test code may be stored at addresses that are mapped in L3 cache 230 and that are aligned according to physical cache boundaries, such as sets or banks, so that access to those addresses always results in L3 cache hits. During test execution, IFU 310 may be configured to sequentially fetch the test code from L3 cache mapped physical addresses.

A variable containing a value indicative of the number of sets to test within L3 cache 230 may then be initialized (block 720). In some embodiments, the variable may be set to a number that begins the test in a portion of the cache other than the known function portion, while in other embodiments, the variable may be initialized to any suitable value. For example, the number of sets to be tested may be less than the maximum number of sets in L3 cache 230 so that the known functional portion of L3 cache 230 is not re-tested.

Using the previously stored cache test code, a POST test suite may then be run on each way within the set currently being tested (block 730). As described above, the POST test suite may implement any number of suitable memory tests such as, checkerboard, for example. Results from the POST test suite may be stored in a register or other suitable memory on processor 200. As discussed above with respect to FIG. 6, the testing of individual cache lines corresponding to the ways of the set under test may be referred to as "cache-line-granular" testing, and the resulting fault information may be considered to be stored on a cache-line-granular basis. As discussed above, testing a cache at the granularity of individual cache lines may facilitate the retirement of individual cache lines, which may permit other cache lines to be used even if they are located in the same set or bank as a failed cache line. However, executing tests of individual cache lines of L3 cache 230 using code fetched directly from L3 cache 230 may be considerably faster than executing such tests using code fetched from another source.

The previously stored results may then be reviewed for non-functional cache lines. Non-functional cache lines may then be retired (block 740). As described above in regards to the test procedure depicted in FIG. 6, a non-functional cache line may be retired by setting a cache line status bit, by noting the non-functional status of the cache line in a central database, or by any suitable means.

The set variable may then incremented so that the next set may be tested (block 750). The incremented value may then be checked to determine whether a termination criterion is satisfied (block 760). For example, the set variable may be checked to determine whether it is less than (or possible equal to) the maximum number of sets to be tested. When the termination condition is not yet satisfied, the POST test suite is executed on the next set within the cache memory (block 730). When the termination condition is satisfied, the testing procedure is completed (block 770). It is noted, that in other embodiments, some or all of the operations illustrated in the flowchart of FIG. 7, may be performed in a different order or may be performed concurrently. For example, in some embodiments, the POST test suite may be performed on all of the sets in a single way or bank and then repeat the POST test suite for another way or bank.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   identifying a portion of a cache memory that is sufficiently functional to store cache test code, wherein the identifying is performed dependent upon instructions stored externally to a processor that includes the cache memory;
   loading cache test code into the portion of the cache memory from a source external to the processor; and
   executing the cache test code by the processor from the cache, wherein the executing comprises testing individual cache lines of the cache memory and storing fault information on a cache-line-granular basis.

2. The method of claim 1, wherein the identifying comprises the processor executing the instructions stored externally to the processor.

3. The method of claim 1, wherein the identifying comprises a service processor external to the processor executing the instructions stored externally to the processor.

4. The method of claim 1, wherein the method further comprises retiring individual cache lines of the cache memory dependent upon the stored fault information.

5. The method of claim 1, wherein the cache test code is configured such that during the executing the cache test code by the processor, the cache test code does not exhibit cache misses that cause the cache memory to access an external memory.

6. The method of claim 1, wherein the loading comprises using a diagnostic mode of addressing cache memory contents that is distinct from a normal mode of accessing cache memory contents.

7. A processor, comprising:
   a cache memory configured to store instructions; and
   a processor core coupled to the cache memory and configured to:
      identify, dependent upon instructions stored externally to the processor, a portion of the cache memory that is sufficiently functional to store cache test code;
      load cache test code into the portion of the cache memory from a source external to the processor; and
      execute the cache test code from the cache memory, wherein to execute the cache test code, the processor core is further configured to perform a cache line test and to store cache line fault information.

8. The processor of claim 7, wherein the processor core is further configured to retire individual cache lines of the cache memory dependent upon the stored cache line fault information.

9. The processor of claim 7, wherein prior to execution of the cache test code, the cache memory is further configured to perform a built-in self-test (BIST) and store cache fault information, and wherein the processor core is further configured to execute the cache test code dependent upon results of the BIST.

10. The processor of claim 9, wherein the cache fault information is indicative of cache faults at a cache way or cache bank level of granularity.

11. The processor of claim 7, wherein to identify the portion of the cache memory dependent upon instructions stored externally to the processor, the processor is further configured to retrieve the instructions from a programmable read-only memory that is distinct from a system memory.

12. The processor of claim 7, wherein the cache test code is configured such that during execution by the processor core, the cache test code will not exhibit cache misses that cause the cache memory to access a system memory.

13. The processor of claim 7, wherein the cache memory is configured to provide a diagnostic mode of addressing cache memory contents that is distinct from a normal mode of addressing cache memory contents, wherein an access to cache memory contents in the diagnostic mode specifies one or more of a cache set, cache way, or cache bank to be accessed, and wherein to load cache test code into the portion of the cache memory, the processor core is further configured to access the cache memory via the diagnostic mode.

14. A system, comprising:
a system memory; and
one or more processors, each including a cache memory, wherein a given one of the one or more processors is configured to:
identify, dependent upon instructions stored externally to the given processor, a portion of the cache memory of the given processor that is sufficiently functional to execute cache test code;
store cache test code into the portion of the cache memory of the given processor from a source external to the processor; and
execute the cache test code from the cache memory, wherein to execute the cache test code, the given processor is further configured to test individual cache lines of the cache memory of the given processor and to store cache line fault information.

15. The system of claim 14, wherein the system further comprises a service processor, wherein the service processor is configured to identify, dependent upon the instructions stored externally to the given processor, the portion of the cache memory of the given processor.

16. The system of claim 14, wherein the given processor is configured to identify, dependent upon the instructions stored externally to the given processor, the portion of the cache memory of the given processor.

17. The system of claim 14, wherein the given processor is further configured to retire individual cache lines of the cache memory of the given processor dependent upon the stored cache line fault information.

18. The system of claim 14, wherein prior to the execution of the cache test code, the cache memory of the given processor is further configured to perform a built-in self-test (BIST) and store cache memory fault information, and wherein the processor is further configured to execute the cache test code dependent upon results of the BIST.

19. The system of claim 18, wherein the cache memory fault information is indicative of cache faults at a cache way or cache bank level of granularity.

20. The system of claim 14, wherein to identify the portion of the cache memory of the given processor dependent upon instructions stored externally to the given processor, the given processor is further configured to retrieve the instructions from a programmable read-only memory that is distinct from a system memory.

* * * * *

UNITED STATES PATENT AND TRADEMARK OFFICE
CERTIFICATE OF CORRECTION

| | |
|---|---|
| PATENT NO. | : 8,904,227 B2 |
| APPLICATION NO. | : 13/562208 |
| DATED | : December 2, 2014 |
| INVENTOR(S) | : Nandam et al. |

It is certified that error appears in the above-identified patent and that said Letters Patent is hereby corrected as shown below:

In the Specification

In column 5, line 51, delete "FIG. 11n" and insert -- FIG. 1. In --, therefor.

Signed and Sealed this
Fourth Day of August, 2015

Michelle K. Lee
*Director of the United States Patent and Trademark Office*